United States Patent
Neitzke

(10) Patent No.: US 10,086,748 B2
(45) Date of Patent: Oct. 2, 2018

(54) METHOD FOR OPERATING A HEADLAMP ARRANGEMENT, HEADLAMP SYSTEM AND MOTOR VEHICLE

(71) Applicant: GM GLOBAL TECHNOLOGY OPERATIONS LLC, Detroit, MI (US)

(72) Inventor: Carsten Neitzke, Huenstetten (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/881,960

(22) Filed: Jan. 29, 2018

(65) Prior Publication Data
US 2018/0215307 A1 Aug. 2, 2018

(30) Foreign Application Priority Data
Jan. 28, 2017 (DE) .......... 10 2017 000 807

(51) Int. Cl.
| | | |
|---|---|---|
| *B60Q 1/02* | (2006.01) | |
| *B60Q 1/14* | (2006.01) | |
| *F21S 41/663* | (2018.01) | |
| *G06T 7/246* | (2017.01) | |
| *G06K 9/00* | (2006.01) | |
| *B60Q 1/08* | (2006.01) | |

(52) U.S. Cl.
CPC .......... *B60Q 1/1407* (2013.01); *B60Q 1/085* (2013.01); *B60Q 1/1423* (2013.01); *F21S 41/663* (2018.01); *G06K 9/00791* (2013.01); *G06T 7/248* (2017.01); *B60Q 2300/056* (2013.01); *B60Q 2300/45* (2013.01); *G06T 2207/30241* (2013.01); *G06T 2207/30252* (2013.01)

(58) Field of Classification Search
CPC .... B60Q 1/0023; B60Q 1/085; B60Q 1/1423; B60Q 1/143; B60Q 9/006; B60Q 2300/054; B60Q 2300/112; B60Q 2300/331
USPC ............................................. 315/77, 80, 82
See application file for complete search history.

(56) References Cited

U.S. PATENT DOCUMENTS

| | | | | |
|---|---|---|---|---|
| 7,541,743 B2 * | 6/2009 | Salmeen | ................ | B60Q 1/085 315/77 |
| 9,415,718 B2 * | 8/2016 | Futamura | ............... | B60Q 1/143 |
| 9,623,793 B2 * | 4/2017 | Langkabel | ............ | B60Q 1/143 |
| 2002/0156559 A1 * | 10/2002 | Stam | .................... | B60Q 1/1423 701/36 |
| 2004/0143380 A1 * | 7/2004 | Stam | ...................... | B60Q 1/085 701/36 |
| 2015/0003087 A1 * | 1/2015 | Futamura | ............... | B60Q 1/143 362/466 |
| 2016/0332568 A1 * | 11/2016 | Kim | ........................ | B60Q 1/50 |
| 2017/0050556 A1 * | 2/2017 | Nakashima | ............ | B60Q 1/085 |
| 2017/0368981 A1 * | 12/2017 | Liken | ................... | B60Q 1/1423 |

\* cited by examiner

*Primary Examiner* — Tung X Le
(74) *Attorney, Agent, or Firm* — Lorenz & Kopf, LLP

(57) ABSTRACT

A method and headlight system is disclosed for operating a headlamp arrangement of a motor vehicle. At least one sensor monitors an area in the traveling direction in front of the motor vehicle. The system acquires an object and calculates object data relative to the motor vehicle, which include a distance of the object, a horizontal location angle of the object as well as an angular velocity of the object. Latency between the object acquisition and change in light distribution for the headlight system is known. A light distribution of the headlamp arrangement is modified as a function of the object data and latency.

18 Claims, 2 Drawing Sheets

METHOD FOR OPERATING A HEADLAMP ARRANGEMENT, HEADLAMP SYSTEM AND MOTOR VEHICLE

CROSS-REFERENCE TO RELATED APPLICATION

This application claims priority to German Patent Application No. 102017000807.8, filed Jan. 28, 2017, which is incorporated herein by reference in its entirety.

TECHNICAL FIELD

The present disclosure pertains to a method for operating a headlamp arrangement, a headlamp system, and a motor vehicle are described below.

BACKGROUND

When driving under poor lighting conditions, for example at dusk or at night, motor vehicles must on the one hand permit a very good illumination of the area lying in front of the motor vehicle in the traveling direction, and on the other hand not expose other road users to glare in the process, for example preceding motor vehicles or oncoming motor vehicles. For this purpose, conventional motor vehicles have two basic light settings—low beam and high beam. The driver manually switches back and forth between the low beam and high beam depending on whether high beam would expose another road user to glare. The driver can either forget to do so, which inevitably results in other road users being exposed to a potentially dangerous glare, or refuse to use the high beam, thus posing the risk to him or herself of not identifying all safety hazards on the road early on.

Newer and advanced headlamp systems often have a so-called matrix light, which instead of a few lighting elements have a plurality of lighting elements that can be actuated individually or as a group, and each illuminate individual sectors. By turning the respective lighting elements on and off, the light distribution of the corresponding headlamp arrangement can be more finely tailored to the respective traffic situation than with conventional solutions. For example, matrix headlamps make it possible to have oncoming traffic be unaffected by the light distribution, and thus not be exposed to glare. Otherwise, however, the light can be set like a classic high beam, which optimizes the view for the driver of a correspondingly equipped motor vehicle.

It is known that corresponding matrix headlamps can be combined with object recognition, which automatically recognizes other vehicles, and thereby enables an automatic and dynamic adjustment of light distribution. To implement a dynamic light distribution, conventional systems require measuring an area ahead in the traveling direction with a camera, evaluating and identifying an object, classifying the object as an object to be faded out, calculating a light distribution, and finally implementing the light distribution in the headlamps. Each of these steps takes time, which is reflected in usual latencies between the recording and adjusting of light distribution measuring 0.2-0.3 seconds. When cornering, this means that the adjustment of light distribution lags behind an oncoming car rounding the curve. Without corrective measures, the oncoming motor vehicle would be driving partially in the light cone, and still be exposed to glare. The latency can be corrected by a correspondingly large safety range around the oncoming motor vehicle by turning off the lighting. As a result, however, the light distribution becomes inhomogeneous, and the illumination deteriorates. In addition, the response by corresponding systems to the emergence of an oncoming motor vehicle is delayed and jerky, which should be avoided so as not to irritate the driver.

SUMMARY

Accordingly, the present disclosure provides methods, headlamp arrangements and motor vehicles of the kind mentioned at the outset so as to enable a better illumination while at the same time preventing oncoming traffic from being exposed to glare.

In particular, a method is disclosed for operating a headlamp arrangement of a motor vehicle. A light distribution from the headlamp arrangement is directed into a region in a forward traveling direction the motor vehicle. A sensing system monitors an area in the traveling direction in front of the motor vehicle, acquires an object and calculates object data. The object data indicates an object trajectory based on a distance of the object relative to the motor vehicle, a horizontal location angle of the object relative to the motor vehicle as well as an angular velocity of the object relative to the motor vehicle. The light distribution of the headlamp arrangement is modified as a function of the object data. In addition, latency between the object acquisition and change in light distribution is known. The light distribution is modified taking into account the object data and latency.

Once an object has been recognized, this makes it possible to compensate for a latency and adjust the light distribution in such a way that only a desired area is faded out at the point in time that the change in light distribution becomes effective. A safety zone around the object can here be kept significantly smaller than in conventional methods. The resultant light distribution is more homogeneous and larger than the previously possible light distributions. Knowing the distance, horizontal location angle and angular velocity of the object relative to the motor vehicle makes it possible to predetermine the relative position of the object and its time change relative to the motor vehicle at the point in time that the change in light distribution becomes effective, and use these values for calculation purposes so as to adjust the light distribution.

In a further embodiment, the present disclosure can provide that the object be acquired over more than one cycle and that object data be calculated such that a prediction of the change in object data is made such that the light distributed may take into account the change in object data. This makes it possible to increase the predictive accuracy for the position of the object at the point in time when the change in light distribution becomes active, so that the light distribution can be adjusted more effectively.

Another embodiment provides that the angular velocity is calculated out of a change in the horizontal position of the object. The distance and change in horizontal position of the object may be used to reliably approximate the movement over a short path for brief periods of time.

In another embodiment, the object data may be estimated in individual cycles if object data are missing or absent. This is possible because the object data can only change within the framework of physical laws and within the framework of specific value ranges. As a result, system reliability can be increased.

In another embodiment, roadmap data can be used while predicting the change in object data. As a result, it is possible to consider a travel path of the vehicle such as a road curvature while predicting the trajectory of the object.

In another embodiment, object data may be obtained via a front camera and/or a car-to-X communication system. A front camera may optically acquire corresponding objects, and car-to-X communication systems may exchange their position, speed, speed change, etc. Alternative technologies for obtaining object data may include radar, Lidar or ultrasound.

In another embodiment, a change in the progression of light distribution may be calculated and implemented based on the object data. As a result, a complete change in the progression of light distribution is calculated in a first step, and may be implemented even when the object recognition is not functioning reliably.

In a related embodiment, the change in progression may be squared with the current object data. As a result, only finer adjustments of the change in progression of light distribution are still required.

The present disclosure also provides a system for operating a headlamp arrangement of a motor vehicle having a sensor, which monitors an area in front of the motor vehicle in the traveling direction. The sensor is set up to acquire an object, and the system is configured to calculate object data. The object data may include a distance of the object relative to the motor vehicle, a horizontal location angle of the object relative to the motor vehicle, as well as an angular velocity of the object relative to the motor vehicle. The system is further configured to change a light distribution of the headlamp arrangement as a function of the object data. System memory or other storage devices are present for storing latency between the object acquisition and change in light distribution such that the light distribution changes are taken into account the latency.

In an embodiment, the sensor and the system are configured to acquire the object beyond more than one cycle and calculate object data. The system is configured to predict the change in object data and distribute the light taking the change in object data into account.

In another embodiment, the system is configured to calculate the angular velocity out of a change in the horizontal position of the object.

According to another embodiment, the system is configured to estimate the object data in individual cycles if the object data are missing or absent.

In another embodiment, the system is further configured to access and use roadmap data in the prediction of the change in object data.

In various embodiments, the sensor may be a front camera, a car-to-X communication system or both sensor types may be used parallel to each other. Alternative sensor technologies include radar, Lidar or ultrasound.

In another embodiment, the system is configured to pre-calculate and implement a change in progression of the light distribution based on the object data.

In another embodiment, the system is configured to square the change in progression with the current object data such that only finer adjustments of the change in progression of light distribution are required.

In another aspect, the present disclosure provides a headlamp system of a motor vehicle with a headlamp arrangement with variable light distribution and at least one sensor for monitoring an area in front of the motor vehicle in the traveling direction and a headlamp controller. The headlamp controller is configured to calculate the object data of an acquired object. The object data include a distance of the object relative to the motor vehicle, a horizontal location angle of the object relative to the motor vehicle, as well as an angular velocity of the object relative to the motor vehicle. The headlamp controller is configured to change a light distribution of the headlamp arrangement as a function of the object data. Latency between the object acquisition and a change in light distribution is stored in the headlamp controller, and the headlamp controller is configured to change the light distribution taking the latency and object data into account.

In an embodiment, the headlamp system may include at least one sensor, one front camera and/or one car-to-X communication system. Alternative sensor technologies include radar, Lidar or ultrasound. Another embodiment can provide a navigation system in communication with the headlamp controller such that roadmap data can be accessed and used in the prediction of the change in object data. In another embodiment, the headlamp arrangement can be a matrix or pixel headlamp arrangement.

In another aspect, the present disclosure provides a motor vehicle with a headlamp system as heretofore described.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
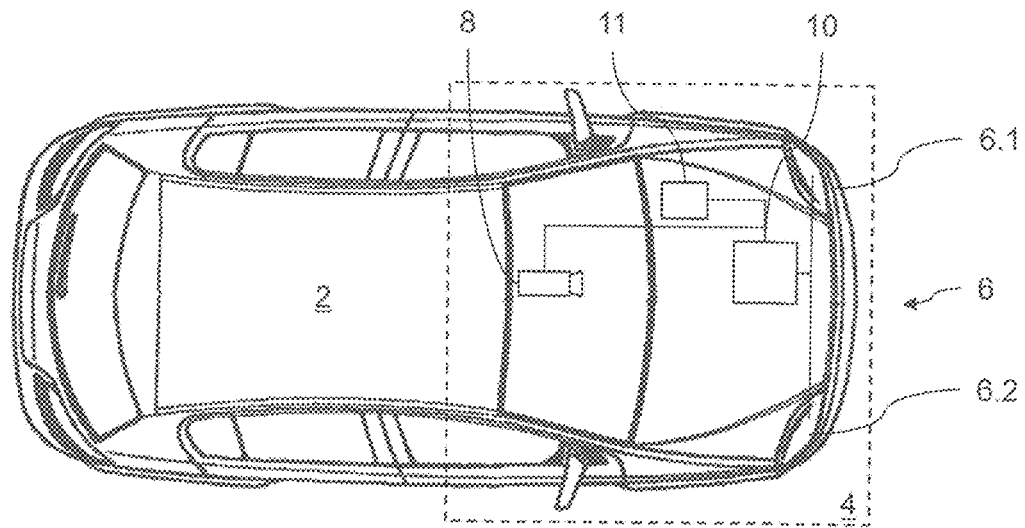
FIG. 1 is a top view of a motor vehicle including a headlamp system.

FIG. 1 presents a top view of a motor vehicle 2. The motor vehicle 2 has a headlamp system 4 (framed with a dashed line). The headlamp system 4 has a headlamp arrangement 6 consisting of two headlamps 6.1, 6.2. The headlamp system 4 further has a sensor such as front camera 8, with which an area in front of the motor vehicle 2 can be recorded. The headlamp arrangement 6 as well as the front camera 8 are connected with a controller 10. The controller 10 is set up to evaluate recordings by the front camera 8 and recognize objects therein, for example oncoming motor vehicles. In alternative embodiments, object recognition can take place in the front camera. In addition, the controller 10 is set up to control the headlamps 6.1 and 6.2. The headlamps 6.1 and 6.2 are so-called matrix headlamps, which have a plurality of individual lighting elements that are arranged in a matrix and can be turned on and off in blocks or individually.

The corresponding headlamp system 4 has a latency that lasts from when an object is recorded by the front camera 8 to when the corresponding matrix lighting elements of the headlamp arrangement 6 turn off. The controller 10 is set up to take this latency into account while adjusting the light distribution of the headlamp arrangement 6.

The controller 10 is here shown in communication with a navigation system 11, so as to obtain roadmap information that is used while determining the relative movement of object data relative to the motor vehicle 2 itself.

Figure 2:
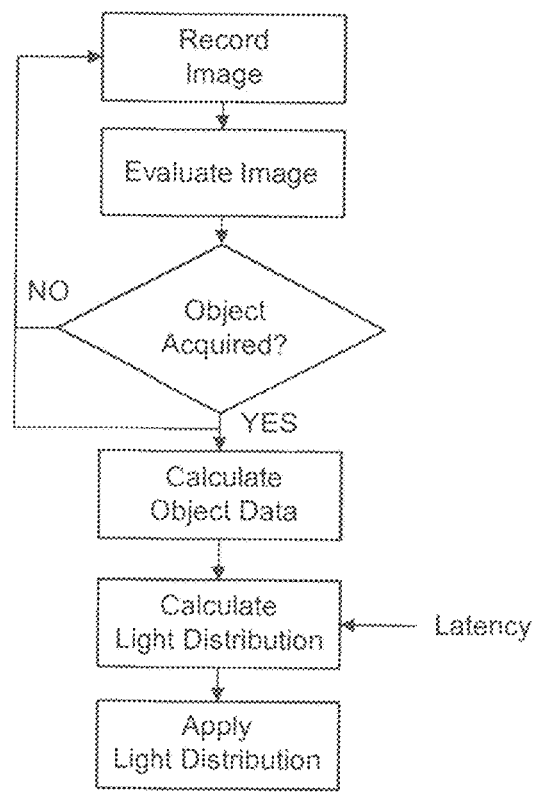
FIG. 2 is a flowchart of a method of controlling a headlamp system.

FIG. 2 shows a flowchart of the method. Initially, an image is recorded with the front camera 8. The image is evaluated and an object is acquired. These processes are continuously repeated. Object data for the object are determined from at least two recorded images. The object data for the object includes a distance, horizontal location angle and angular velocity of the object relative to the motor vehicle 2, and are used to calculate a trajectory of the object relative to the respective motor vehicle.

A light distribution is calculated and implemented based on the position of these three vectors, taking into account the latency of the headlamp system 4. This method is repeated until the object has moved out of the light distribution. The method is initiated again when another object is recognized. The method also functions for several objects, for example given several motor vehicles in a row coming toward the respective motor vehicle.

Figure 3:
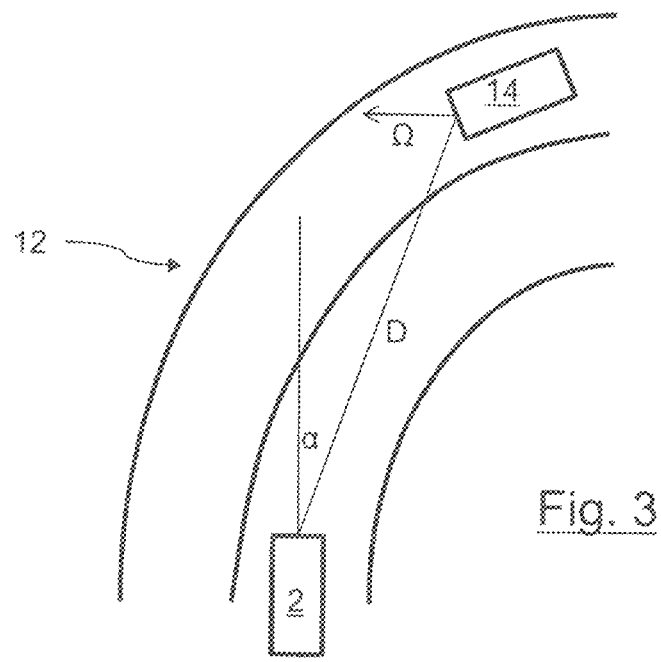
FIG. 3 is a top view of a road situation.

FIG. 3 presents a top view of a traffic situation on a road 12. The road 12 describes a right turn as viewed from the motor vehicle 2. Another motor vehicle 14 is coming toward the respective motor vehicle 2. The front camera 8 of the motor vehicle 2 acquires the oncoming motor vehicle 14, from which the controller 10 calculates a relative speed of the motor vehicle 14 in relation to the respective motor vehicle 2. This relative speed is found by overlapping the corresponding separate speeds and directions and rotational speeds of the motor vehicles 2 and 14 traveling toward each other. The controller 10 uses the distance D and change in horizontal location angle α to calculate an angular velocity of the motor vehicle 14, so as to determine the position at the point in time when the change in headlamp arrangement light distribution 16 is implemented, and thus to correspondingly actuate the headlamps 6.1, 6.2.

Figure 4:
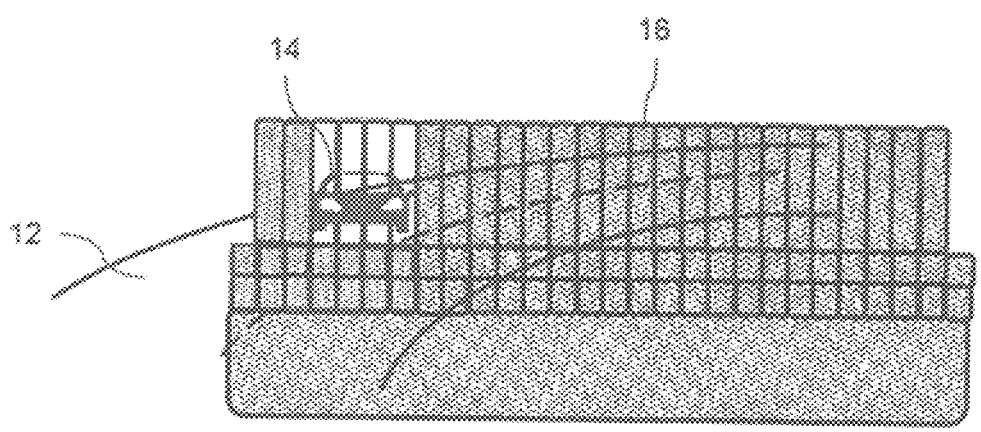
FIG. 4 is a view a corresponding light distribution given the road situation shown in FIG. 3.

FIG. 4 shows the traffic situation from FIG. 3 as viewed from the motor vehicle 2. The view is overlaid by an illustration of the light distribution 16 generated by the light segments of the headlamp arrangement 6. To prevent oncoming traffic from being exposed to glare, those matrix lighting elements of the headlamp arrangement 6 that overlap with the motor vehicle 14 are deactivated. A slight safety distance is here provided to prevent the driver of the motor vehicle 14 from being exposed to glare. The areas in front, in back and on either side of the motor vehicle 14 remain sufficiently illuminated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A method for operating a headlamp arrangement of a motor vehicle comprises:
    directing a light distribution from the headlamp arrangement in a forward traveling direction the motor vehicle;
    monitoring a region in front of the motor vehicle with at least one sensor;
    acquiring an image of an object in the region;
    calculating an object data while the object is in the region, wherein the object data indicates an object trajectory based on a distance of the object, a horizontal location angle of the object relative and an angular velocity of the object with respect to the motor vehicle; and
    modifying the light distribution as a function of the object data and a latency between the object acquisition and a change in the light distribution.

2. The method according to claim 1, further comprising obtaining the object data from a car-to-X communication system.

3. The method according to claim 1, further comprising calculating the object data from the image.

4. The method according to claim 3, further comprising:
    acquiring at least two images of the object in the region;
    calculating the object data from the at least two images;
    predicting a change in the object trajectory; and
    modifying the light distribution taking into account the change in object data.

5. The method according to claim 3, further comprising calculating the angular velocity based on a change in horizontal position of the object.

6. The method according to claim 3, wherein the object data are estimated in individual cycles when at least one of the distance, the horizontal location angle and the angular velocity of the object with respect to the motor vehicle cannot be calculated from the image.

7. The method according to claim 3, further comprising acquiring roadmap data indicating a travel path of the motor vehicle, and predicting the change in object data based on the travel path.

8. The method according to claim 3, further comprising changing a progression of the light distribution, wherein the progressions is pre-calculated and implemented based on the object data.

9. The method according to claim 8, wherein the change in progression is squared with the current object data.

10. A headlamp system of a motor vehicle comprising:
    a headlamp arrangement operable to direct a variable light distribution from the headlamp arrangement in a forward traveling direction the motor vehicle;
    at least one sensor configured to monitor a region in front of the motor vehicle; and
    a headlamp controller configured to:
        direct a light distribution from the headlamp arrangement in a forward traveling direction the motor vehicle;
        monitor a region in front of the motor vehicle with at least one sensor;
        acquire an image of an object in the region;
        calculate an object data while the object is in the region, wherein the object data indicates an object trajectory based on a distance of the object, a horizontal location angle of the object relative and an angular velocity of the object with respect to the motor vehicle; and
        modify the light distribution as a function of the object data and a latency between the object acquisition and a change in the light distribution.

11. The headlamp system according to claim 10, wherein the at least one sensor is selected from the group consisting of a front camera, a radar sensor, a lidar sensor, a ultrasound sensor and combinations thereof.

12. The headlamp system according to claim 10, wherein the headlamp controller is further configured to calculate the object data from the image.

13. The headlamp system according to claim 10, wherein the headlamp controller is further configured to:
   acquire at least two images of the object in the region;
   calculate the object data from the at least two images;
   predict a change in the object trajectory; and
   modify the light distribution taking into account the change in object data.

14. The headlamp system according to claim 13, wherein the headlamp controller is further configured to calculate the angular velocity based on a change in horizontal position of the object.

15. The headlamp system according to claim 13, wherein the headlamp controller is further configured to acquire roadmap data indicating a travel path of the motor vehicle, and predict the change in object data based on the travel path.

16. The headlamp system according to claim 13, wherein the headlamp controller is further configured to change a progression of the light distribution, wherein the progressions is pre-calculated and implemented based on the object data.

17. The headlamp system according to claim 13, wherein the change in progression is squared with the current object data.

18. The headlamp system according to claim 10, wherein the headlamp arrangement comprises a matrix headlamp arrangement.

\* \* \* \* \*